Dec. 30, 1952
E. W. BOTTUM
2,623,607
REFRIGERATION DEHYDRATOR
Filed Aug. 16, 1949
2 SHEETS—SHEET 1
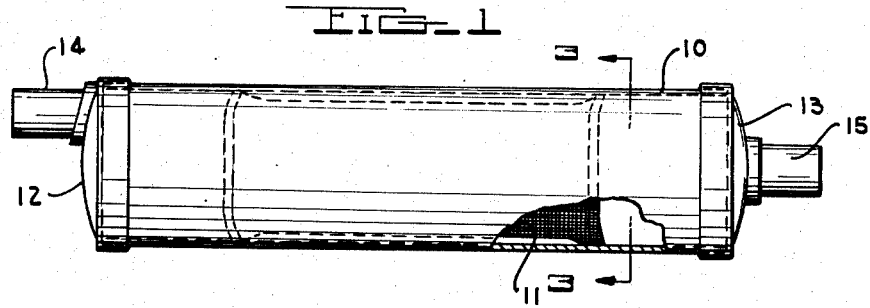
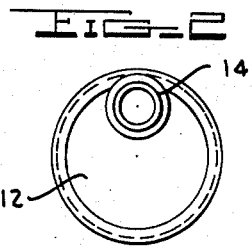 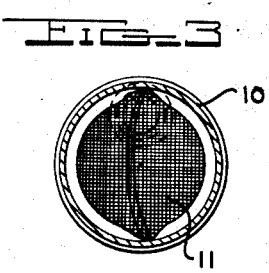 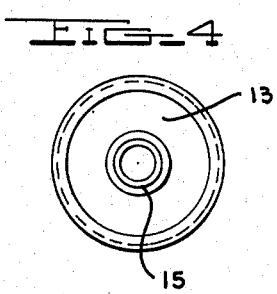
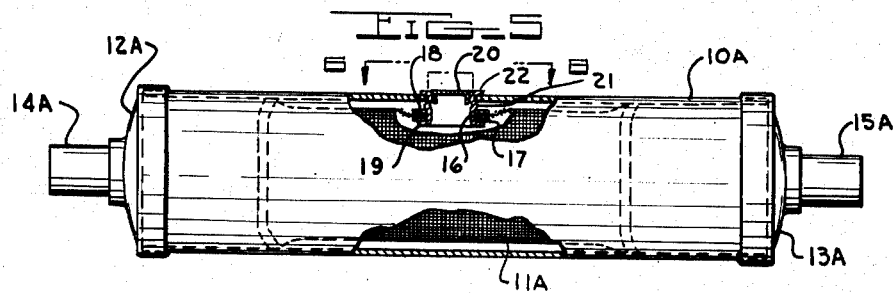
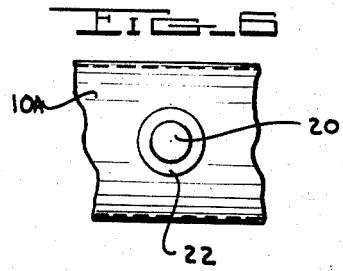
INVENTOR.
EDWARD W. BOTTUM
BY
*Arthur M. Smith*
ATTORNEY Dec. 30, 1952      E. W. BOTTUM      2,623,607
REFRIGERATION DEHYDRATOR
Filed Aug. 16, 1949      2 SHEETS—SHEET 2
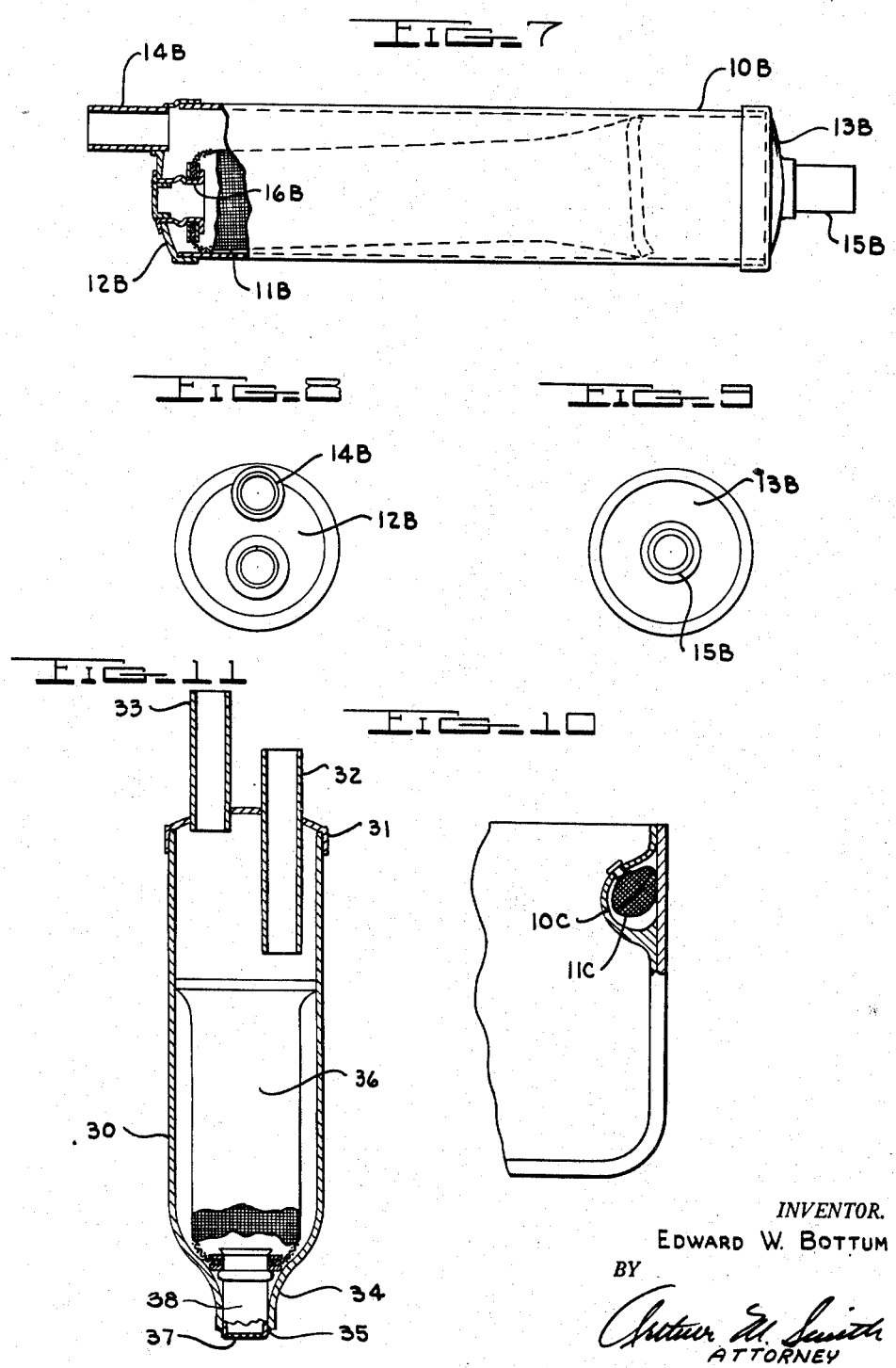
INVENTOR.
EDWARD W. BOTTUM
BY
Arthur M. Smith
ATTORNEY Patented Dec. 30, 1952

2,623,607

UNITED STATES PATENT OFFICE 2,623,607

REFRIGERATION DEHYDRATOR

Edward W. Bottum, Detroit, Mich.

Application August 16, 1949, Serial No. 110,604

8 Claims. (Cl. 183—4.8)

The present invention relates to a dehydrator and accumulator for a refrigerator circuit which may be placed in the refrigerating system to maintain the refrigerant in a condition in which it is substantially free from moisture at all times.

The usual refrigerating system is composed of a compressor, condenser, expansion member, and evaporator connected in a closed circuit through which the refrigerant is circulated. A dehydrator is placed in the system to adsorb moisture from the refrigerant and the system and thus prevent the formation of ice crystals within the system. The dehydration material must be inert so far as reaction with the refrigerant is concerned. Silica gel in granular form is generally used in such devices.

The pressure circulation of the refrigerant causes the free granules of silica gel used in conventional dehydrates to be mixed with the refrigerant and for the refrigerant and the silica gel to flow in a turbulent manner in the dehydrator. This causes the particles of the silica gel to become finer and finer, and some of the finer particles to escape from the dehydrator and get into the refrigerant. In many instances the dehydrator screens have been clogged by reason of this fine accumulation of silica gel and have prevented the free circulation of the refrigerant through the system.

It is, therefore, an object of the present invention to provide a refrigerator dehydrator wherein the dehydrating material is contained in a mesh bag disposed in the dehydrator casing so that the refrigerant will circulate freely through the dehydrator without breaking down the particles of the dehydrating material and clogging the dehydrator.

Another object of the present invention is to provide a refrigerator dehydrator having the dehydrating material in powder form, contained in a mesh bag disposed in the dehydrator casing and wherein the said bag is provided with a filler neck extending through the container shell so that the complete assembly may be formed before inserting the dessicant, thus avoiding exposure of the dessicant to unnecessary heating in the assembly process.

Another object of the present invention is to provide an efficient refrigerator dehydrator having the dehydrating material disposed within a mesh bag within the dehydrator shell, and wherein the outlet port is located above the inlet port so that the dehydrator will also act as an accumulator to hold up excess liquid in the unit and prevent the liquid from being drawn off as the gaseous refrigerant is circulated.

Other objects of this invention will appear in the following description and appended claims, reference being had to the accompanying drawings forming a part of this specification wherein like reference characters designate corresponding parts in the several views.

In the drawings:

Fig. 1 is a side view of a refrigerator dehydrator showing one embodiment of the present invention.

Fig. 2 is a left end view of the device shown in Fig. 1.

Fig. 3 is a sectional view taken along the line 3—3 in the direction of the arrows, Fig. 1.

Fig. 4 is a right end view of the device shown in Fig. 1.

Fig. 5 is a side view of another embodiment of the present invention with parts broken away to reveal the interior construction.

Fig. 6 is a fragmentary top view taken along the line 6—6 in the direction of the arrows, Fig. 5.

Fig. 7 is a side elevation of another embodiment of the present invention with portions broken away for clarity.

Fig. 8 is a left end view of the device shown in Fig. 7.

Fig. 9 is a right end view of the device shown in Fig. 7.

Fig. 10 is an elevation of a refrigerator evaporator with a dehydrator embodying the present invention built therein, parts of the view being broken away for clarity.

Fig. 11 is a side elevation of another embodiment of the present invention with portions broken away for clarity.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Figs. 1-4 of the drawings, a dehydrator and accumulator embodying the present invention is shown comprising a tubular casing 10 having disposed therein a wire mesh bag 11 formed of Monel metal or similar non-corrosive material which contains a dehydrating compound such as silica gel. The bag 11 is formed so that the corners contact the walls of the casing 10 and thus space the main body of the said bag 11 from the walls of the said casing 10. Closure caps 12 and 13 are placed over the ends of the casing 10. Tube portions 14 and 15 project from the said caps 12 and 13 respectively and are securely fitted thereto to form an integral part thereof.

It will be noted that the outlet pipe 14 is located on a horizontal plane above the inlet pipe 15. This construction makes the device an accumulator as well as a dehydrator and excess liquid refrigerant will accumulate in the dehydrator and will not be drawn off through the pipe 14 with the circulating gaseous refrigerant.

Since silica gel breaks down at approximately 400° F., only the corners of the wire mesh bag 11 engage the inner walls of the casing 10, and the bag length is less than the length of the casing 10, so that an air space is provided which surrounds and insulates the body of the mesh bag 11. Consequently, upon soldering the caps 12 and 13, the silica gel within the bag is held far enough away from the heating of the said caps so that it will not be broken down. The construction of this form of device embodying the present invention is such that the bag containing the silica gel is spaced from the casing and decomposition is avoided.

Figs. 5 and 6 show a modification of the present invention. The chief difference between this construction and the construction shown in Figs. 1–4 inclusive is that a tubular neck 16 is fitted to a mesh bag 11A and extends through an opening in the sidewall of the dehydrator container 10A. The mesh screen 11A is provided with a hole and the washers 17 and 18 are placed one on each side of the hole adjacent the screen 11A. The neck member 16 which is provided with the flange 19 is then inserted through the washers 17 and 18 and sidewall of the screen 11A and is upset to provide the collar 21. The neck 16 is then extended through the hole in the sidewall of the dehydrator casing 10A and is flared at 22 to hold the bag 11A in place. After the dehydrator casing is assembled, the silica gel or other dehydrating agent may be inserted through the neck 16 and then a plug 20 is placed in the neck 16 and is silver soldered thereto. The advantage of this modification is that the casing 10A and caps 12A and 13A may be hydrogen brazed or the like before the silica material is put into the mesh portion 11A of the dehydrator. This is advantageous in that the only soldering which will be done after the material is placed in the mesh bag 11A is the soldering of the plug over the neck 16. The heat required in this operation would not be such as to cause any decomposition of the silica gel. Heating of the whole dehydrator in a hydrogen furnace or the like would build up such temperatures as to cause decomposition of the silica gel. The bag 11A may be of any type of porous material which is not affected by the refrigerant or by the temperatures which would be encountered in the joining or soldering of the closure caps 12A and 13A and the casing 10A.

The modification of the invention shown in Figs. 7–9 inclusive is similar to the modification shown in Figs. 5 and 6, except that the neck 16B is located at one end rather than in the middle of the mesh bag 11C and extends through a hole in the cap 12B.

Fig. 10 of the drawings shows the device of the present invention built into the evaporator chamber of a refrigerating system. It is placed in this position in the system because the moisture in the system will be readily adsorbed by the dehydrating agent. Since the dehydrator is horizontally disposed, the device will also act as an accumulator if the inlet tube is disposed below the outlet tube as indicated in Figs. 1 and 7. The screen mesh forming the holder for the dehydrating material acts as a baffle to prevent the by-passing of droplets of liquid refrigerant.

Fig. 11 shows a further modification of the present invention as applied to a vertical type of dehydrator. In this embodiment the shell 30 is closed on its one end by the cap 31 having the inlet 32 and the outlet 33 secured thereto. The opposite end of the shell 30 is reduced as at 34 and is provided with an opening 35. The mesh bag 36 is provided with a tubular neck 38 which communicates with the interior of the said bag 36 and which fits into the reduced portion 34 of the casing 30 in the assembled position. In this embodiment the bag 36 is placed in the shell 30, the cap 31 is mounted thereon and the entire assembly may be passed through a brazing furnace or oven and all joints are brazed in the one operation. When the shell 30 and cap 31 are thus secured together, the dessicant is supplied to the bag 36 through the neck 38 which extends through the hole 35. The open neck 38 is then closed by the plug 37 which is secured thereto as by soldering.

The dehydrator of the present invention is adapted particularly but not exclusively for use on the low side of a refrigerator system since the power of the silica gel to adsorb moisture from the refrigerant decreases with a rise in temperature.

From the foregoing, it will be seen that I have provided a novel refrigerator dehydrator construction wherein the dehydrating agent is supported in a mesh bag to permit a better flow of refrigerant through the dehydrator than is the case when the dehydrating material is placed loosely in the casing and is free to move with the refrigerant. In the latter instance, the tendency is for the dehydrating agent to pack against the discharge end of the dehydrator and to clog the screens provided therein thus causing considerable resistance to flow of refrigerant through the dehydrator.

Further, due to the relative locations of the inlet and outlet tube portions, when the dehydrator of the present invention is disposed in either the horizontal or vertical position it also acts as a refrigerant accumulator.

Dehydrators using the mesh bag of the present invention have a superior performance in a refrigerant line as there is no pressure drop through the dehydrator and this allows better efficiency of the compressor due to the higher suction or negative pressures which result.

Having thus described my invention, I claim:

1. A combined dehydrator and accumulator adapted for placement in a refrigerating system to dehydrate a fluid refrigerant and accumulate excess moisture therefrom, comprising a hollow casing having a top which is closed except for an inlet pipe and an outlet pipe extending therethrough into the interior of the casing, a substantially pillow-shaped mesh bag containing a dehydrating agent disposed within said casing below said pipes, said bag having a flattened end portion the edges of which contact the sidewall of the casing to space the said bag therefrom and provide unoccupied space within the casing, the bottom of said casing being closed and the device being adapted to receive a refrigerant through the inlet pipe and dispel it out the outlet pipe after it has been subjected to the dehydrating agent.

2. A combined dehydrator and accumulator as claimed in claim 1 and further characterized in that the inlet pipe extends further into the casing than the outlet pipe.

3. A combined dehyrator and accumulator comprising a tubular casing adapted to have its longitudinal axis vertically disposed in a refrigerating system and having a reduced open portion at the bottom thereof, a closure cap fitted over the top of said casing and having an inlet pipe and an outlet pipe extending therethrough into the interior of said casing, a mesh bag containing a dehydrating agent disposed within said casing below said pipes and having only its edge portions in contact with the inner walls of said container to provide unoccupied space within said casing, said mesh bag having a tubular neck extending from the interior thereof into the reduced open portion of the casing, and a plug to close the tubular neck of the mesh bag, said bag thus being adapted to be filled from outside the casing while disposed within the casing.

4. A combined dehydrator accumulator and baffle adapted for connection in the refrigerant line of a refrigerating system and comprising a casing, inlet and outlet means communicating with the interior of said casing and adapted for connection in a refrigerating circuit, a mesh envelope filled with a dehydrating agent and having a sealed flattened end portion of greater length than the diameter of said casing, the corners of said sealed flattened end portion lying outside the projected surfaces of the said filled mesh envelope and being deformed to engage the interior wall of said casing at spaced points and provide supporting contacts to maintain the major portion of said envelope within the refrigerant stream in spaced relation to the interior sidewalls of said casing, thus providing a substantial amount of unoccupied and unobstructed space between said inlet and outlet means and a path around said envelope to permit the free flow of refrigerant through said casing in contact with the exterior surfaces of said envelope while maintaining a substantially constant refrigerant pressure between said inlet and outlet means.

5. A combined dehydrator accumulator and baffle as claimed in claim 4 wherein both ends of the mesh envelope are flattened so that the said envelope is supported in the casing by the corners of both flattened end portions.

6. A combined dehydrator accumulator and baffle as claimed in claim 4 wherein the envelope has a rigid neck portion extending through a hole in the sidewall of the casing and secured to said casing, and a closure cap is fitted within said neck portion.

7. A combined dehydrator accumulator and baffle as claimed in claim 4 wherein the inlet and outlet means comprise a first closure cap fitted over one end of said casing and having a tube extending therethrough to communicate with the interior of the casing, and a second closure cap fitted over the other end of the casing and having a tube extending therethrough to communicate with the interior of the casing, said mesh envelope having a neck portion extending through a hole in said second closure cap, and a plug fitted in said neck portion.

8. A combined dehydrator accumulator and baffle as claimed in claim 4 wherein the casing is built into the evaporation chamber of a refrigerating system.

EDWARD W. BOTTUM.

REFERENCES CITED

The following references are of record in the file of this patent:

UNITED STATES PATENTS

| Number | Name | Date |
| --- | --- | --- |
| 1,839,350 | Slagel | Jan. 5, 1932 |
| 2,199,258 | Gray | Apr. 30, 1940 |
| 2,430,692 | Touborg | Nov. 11, 1947 |
| 2,504,184 | Dawson | Apr. 18, 1950 |